United States Patent
Takama

(10) Patent No.: US 11,436,788 B2
(45) Date of Patent: Sep. 6, 2022

(54) FILE GENERATION APPARATUS, IMAGE GENERATION APPARATUS, FILE GENERATION METHOD, AND STORAGE MEDIUM

(71) Applicant: CANON KABUSHIKI KAISHA, Tokyo (JP)

(72) Inventor: Yasufumi Takama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/707,173

(22) Filed: Dec. 9, 2019

(65) Prior Publication Data

US 2020/0202610 A1 Jun. 25, 2020

(30) Foreign Application Priority Data

Dec. 19, 2018 (JP) .............................. JP2018-237547

(51) Int. Cl.
*G06T 15/20* (2011.01)
*G06Q 30/02* (2012.01)

(52) U.S. Cl.
CPC ......... *G06T 15/20* (2013.01); *G06Q 30/0272* (2013.01); *G06Q 30/0277* (2013.01)

(58) Field of Classification Search
CPC ............... G06Q 30/02; G06Q 30/0272; G06Q 30/0277; G06T 15/20; G06T 15/205; G06T 17/00
See application file for complete search history.

(56) References Cited

U.S. PATENT DOCUMENTS

| | | | |
|---|---|---|---|
| 8,943,535 B2 | 1/2015 | Sakamoto et al. | |
| 9,767,562 B2 | 9/2017 | Takama et al. | |
| 9,909,854 B2 | 3/2018 | Yoshibayashi et al. | |
| 10,424,067 B2 | 9/2019 | Takama et al. | |
| 10,877,649 B2 * | 12/2020 | Fujita | .................... G06F 1/1694 |
| 2014/0059588 A1 | 2/2014 | Sakamoto et al. | |
| 2014/0063061 A1 * | 3/2014 | Reitan | ...................... G09G 5/14 345/633 |

(Continued)

FOREIGN PATENT DOCUMENTS

| | | |
|---|---|---|
| JP | 2002-208036 A | 7/2002 |
| JP | 2012-048639 A | 3/2012 |

(Continued)

OTHER PUBLICATIONS

May 6, 2020 European Search Report in European Patent Appln. No. 19216664.3.

(Continued)

*Primary Examiner* — Ming Wu
(74) *Attorney, Agent, or Firm* — Venable LLP

(57) ABSTRACT

The present invention is a file generation apparatus that generates a file for generating a virtual viewpoint image. The image file generation apparatus in one aspect of the present invention has a material information accumulation unit 520 configured to acquire and accumulate material information used for generation of a virtual viewpoint image, a virtual advertisement information acquisition unit 530 configured to acquire advertisement information that is displayed on a virtual viewpoint image, and an image file generation unit 540 configured to generate an image file including material information and advertisement information.

19 Claims, 17 Drawing Sheets

(56) References Cited

U.S. PATENT DOCUMENTS

| | | | | |
|---|---|---|---|---|
| 2014/0368426 | A1* | 12/2014 | Umehara | G09G 5/12 |
| | | | | 345/156 |
| 2017/0010794 | A1 | 1/2017 | Cho et al. | |
| 2018/0220125 | A1* | 8/2018 | Tamir | H04N 13/279 |
| 2018/0288394 | A1 | 10/2018 | Aizawa | |
| 2020/0288217 | A1* | 9/2020 | Takahashi | G06T 19/00 |

FOREIGN PATENT DOCUMENTS

| | | |
|---|---|---|
| JP | 2014-041259 A | 3/2014 |
| JP | 2015-045920 A | 3/2015 |
| JP | 2018-180654 A | 11/2018 |

OTHER PUBLICATIONS

Adrian Hilton, et al., "3D-TV Production from Conventional Cameras for Sports Broadcast", IEEEE Transactions on Broadcasting, vol. 57, No. 2, Jun. 2011, pp. 1-15.

Evren Imre, et al., "Calibration of Nodal and Free-Moving Cameras in Dynamic Scenes for Post-Production", 3D Imaging, Modeling, Processing, Visualization and Transmission (3DIMPVT), 2011 International Conference on 3D Imaging, IEEE, May 2011, pp. 260-267.

Matthias Sander, et al., "Impact of Virtual Advertising in Sports Events", Anonymous, Jan. 2010, pp. 1-19.

\* cited by examiner

| |
|---|
| size |
| file size |
| meta |
| data type |
| number of cameras |
| data |
| external parameters of Nth camera |
| internal parameters of Nth camera |

FIG.9

| |
|---|
| size |
| file size |
| moov |
| width of camera image |
| height of camera image |
| number of actual cameras |
| total number of frames of camera image |
| image capturing start time |
| image capturing end time |
| data |
| pixel information on camera image |

FIG.10

| size | |
| --- | --- |
| | file size |
| meta | |
| | data type |
| data | |
| | Obj file path |
| | Mtl file path |

FIG.11

| |
|---|
| size |
| file size |
| meta |
| data type |
| number of advertisements |
| data size |
| address of advertisement database |
| data |
| advertisement ID |
| advertiser |
| advertisement creator |
| sports name |
| sports stadium name |
| game day |
| display time |
| display start time |
| display end time |
| expiration date |
| advertisement model data |
| advertisement material data |
| display effect |
| virtual viewpoint dependence |
| advertisement paste area on virtual viewpoint image |
| priority |

FIG.12

| |
|---|
| size |
| file size |
| meta |
| data type |
| advertiser table |
| data |
| advertisement ID |
| advertiser |
| advertisement creator |
| sports name |
| sports stadium name |
| game day |
| actual advertisement image |
| camera ID |
| actual sign area |
| priority |

FIG.16

FILE GENERATION APPARATUS, IMAGE GENERATION APPARATUS, FILE GENERATION METHOD, AND STORAGE MEDIUM

BACKGROUND OF THE INVENTION

Field of the Invention

The present invention relates to a technique for generating a virtual viewpoint image to which additional information is assigned.

Description of the Related Art

In recent years, as a technique to reproduce an image from a camera (hereinafter, virtual camera) set within a three-dimensional virtual space by installing a plurality of cameras at different positions and using images captured by the plurality of cameras (hereinafter, actual camera), there is a virtual viewpoint image generation technique (Japanese Patent Laid-Open No. 2015-45920).

However, for the virtual viewpoint image generation apparatus of Japanese Patent Laid-Open No. 2015-45920, displaying virtual additional information (for example, virtual advertisement, information relating to a player captured in a virtual viewpoint image, or the like) in a virtual viewpoint image at the time of providing the virtual viewpoint image to a viewer is not discussed. In a case where displaying a virtual advertisement as additional information is supposed, for the virtual viewpoint image generation apparatus of Japanese Patent Laid-Open No. 2015-45920, displaying a virtual advertisement is not discussed. Because of this, at the time of providing (displaying) a virtual viewpoint image, an advertiser will lose a chance of advertising. Further, in a case where a specific object, such as a player, is brought into focus in a captured image, there is a possibility that the area in which additional information (for example, advertisement sign, cheering flag, or the like) that is installed in a real space is not well focused, and therefore, an unclear image will result. In a case where an advertisement (hereinafter, also referred to as actual advertisement) that is installed in a real space is used, on a condition that the area corresponding to the actual advertisement on the virtual viewpoint image is unclear, there is a possibility that a viewer of the virtual viewpoint image cannot recognize the contents of the actual advertisement. In this case also, an advertiser will lose a chance of advertising.

The present invention has been made in view of the conventional problem described previously and an object thereof is to make it possible to display a virtual viewpoint image to which additional information is assigned at the time of displaying the virtual viewpoint image.

SUMMARY OF THE INVENTION

The file generation apparatus of the present invention has: a first acquisition unit configured to acquire material information for generating a virtual viewpoint image based on a plurality of captured images obtained from a plurality of image capturing apparatuses; a second acquisition unit configured to acquire advertisement information relating to an advertisement that is displayed on the virtual viewpoint image; and a file generation unit configured to generate a file including material information acquired by the first acquisition unit and advertisement information acquired by the second acquisition unit.

Further features of the present invention will become apparent from the following description of exemplary embodiments with reference to the attached drawings.

BRIEF DESCRIPTION OF THE DRAWINGS

FIG. 9 is a diagram showing a format of camera parameters in an image file;

FIG. 10 is a diagram showing a format of information relating to a plurality of captured image in an image file;

FIG. 11 is a diagram showing a format of background model information in an image file;

FIG. 12 is a diagram showing a format of virtual advertisement information in an image file;

FIG. 16 is a diagram showing a format of actual advertisement information in an image file.

DESCRIPTION OF THE EMBODIMENTS

In the following, embodiments of the present invention are explained with reference to the drawings. The following embodiments are not intended to limit the present invention and all combinations of features explained in the present embodiments are not necessarily indispensable to the solution of the present invention. In addition, a variety of aspects in the scope not deviating from the gist of the present invention are also included in the present invention and it is also possible to appropriately combine part of the following embodiments. In addition, the virtual viewpoint image generated in each embodiment may be a moving image or a still image.

First Embodiment

In the present embodiment, a method of assigning material information for generating a virtual viewpoint image and virtual advertisement information as additional information to an image file and a method of generating and displaying a virtual viewpoint image to which a virtual advertisement is assigned by using the file are explained. In the following embodiment, an example is explained in which information relating to an advertisement is assigned to an image file as additional information, but the additional information that is assigned is not limited to information relating to an advertisement. The additional information may be, for example, information relating to a player captured in a virtual viewpoint image, or information relating to a game.

<System Configuration>

Figure 1:
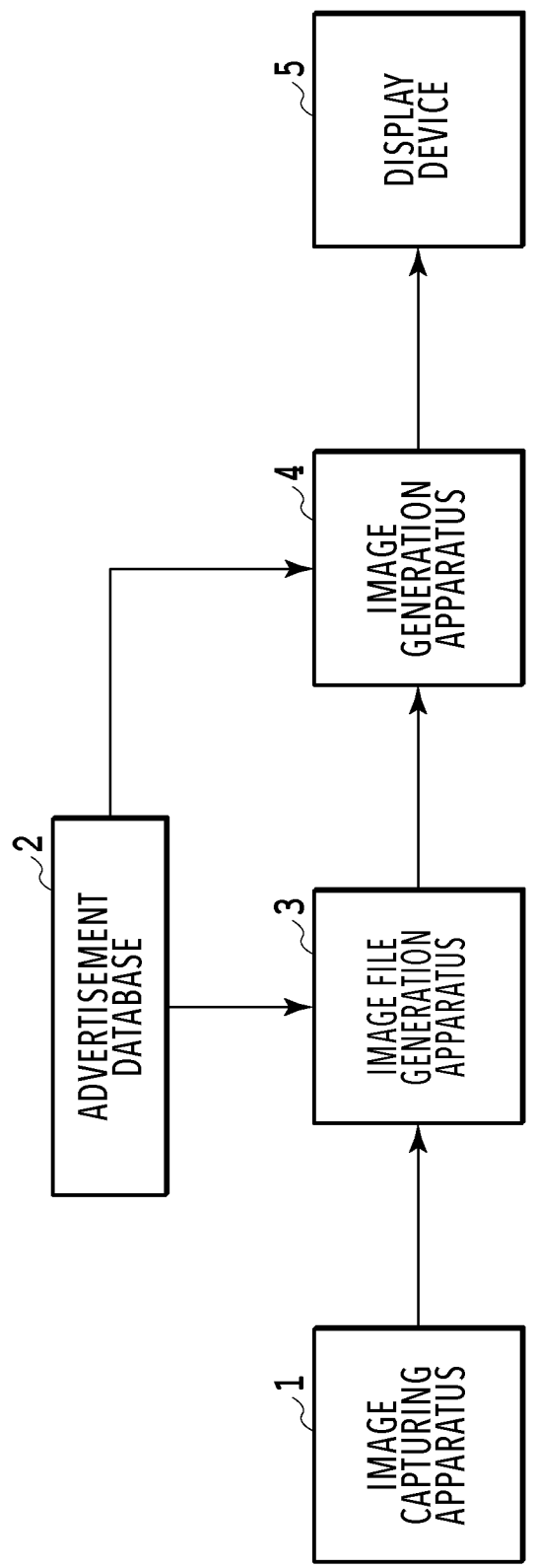
FIG. 1 is a diagram showing a configuration of an image generation system.

FIG. 1 is a diagram showing a configuration of an image generation system according to the present embodiment. As shown in FIG. 1, the image generation system according to the present embodiment comprises an image capturing apparatus 1, an advertisement database 2, an image file generation apparatus 3, an image generation apparatus 4, and a display device 5.

The image capturing apparatus 1 includes a plurality of actual cameras and these actual cameras respectively capture an object from different directions. Each of the actual cameras has a camera number for identifying the individual and transmits camera parameters and captured images to the image file generation apparatus 3.

The camera parameters include external parameters and internal parameters and the external parameters are supposed to be information on the position and orientation of the actual camera and the internal parameters are supposed to be information on the focal length of the actual camera and the center coordinates of an image sensor. Further, in the present embodiment, the lens distortion is not taken into consideration, but it may also be possible to use a parameter that takes the lens distortion into consideration as needed.

The advertisement database 2 receives virtual advertisement information created by an advertiser, an advertisement creator, or the like, not shown schematically, and saves the virtual advertisement information. Further, the advertisement database 2 transmits virtual advertisement information in response to a request from the image file generation apparatus 3. Details of the virtual advertisement information will be described later.

The image file generation apparatus 3 receives captured images and the camera parameters of all the actual cameras from the image capturing apparatus 1 and saves them. Further, the image file generation apparatus 3 acquires virtual advertisement information from the advertisement database 2. The image file generation apparatus 3 further generates an image file to which material information used for generation of a virtual viewpoint image and virtual advertisement information are assigned and distributes the image file to the image generation apparatus 4.

The image generation apparatus 4 generates a virtual viewpoint image to which a virtual advertisement is assigned based on the material information and the virtual advertisement information assigned to the image file and transmits the virtual viewpoint image to the display device 5. The display device 5 receives the virtual viewpoint image transmitted from the image generation apparatus 4 and displays the virtual viewpoint image on a display or the like, not shown schematically.

Figure 2:
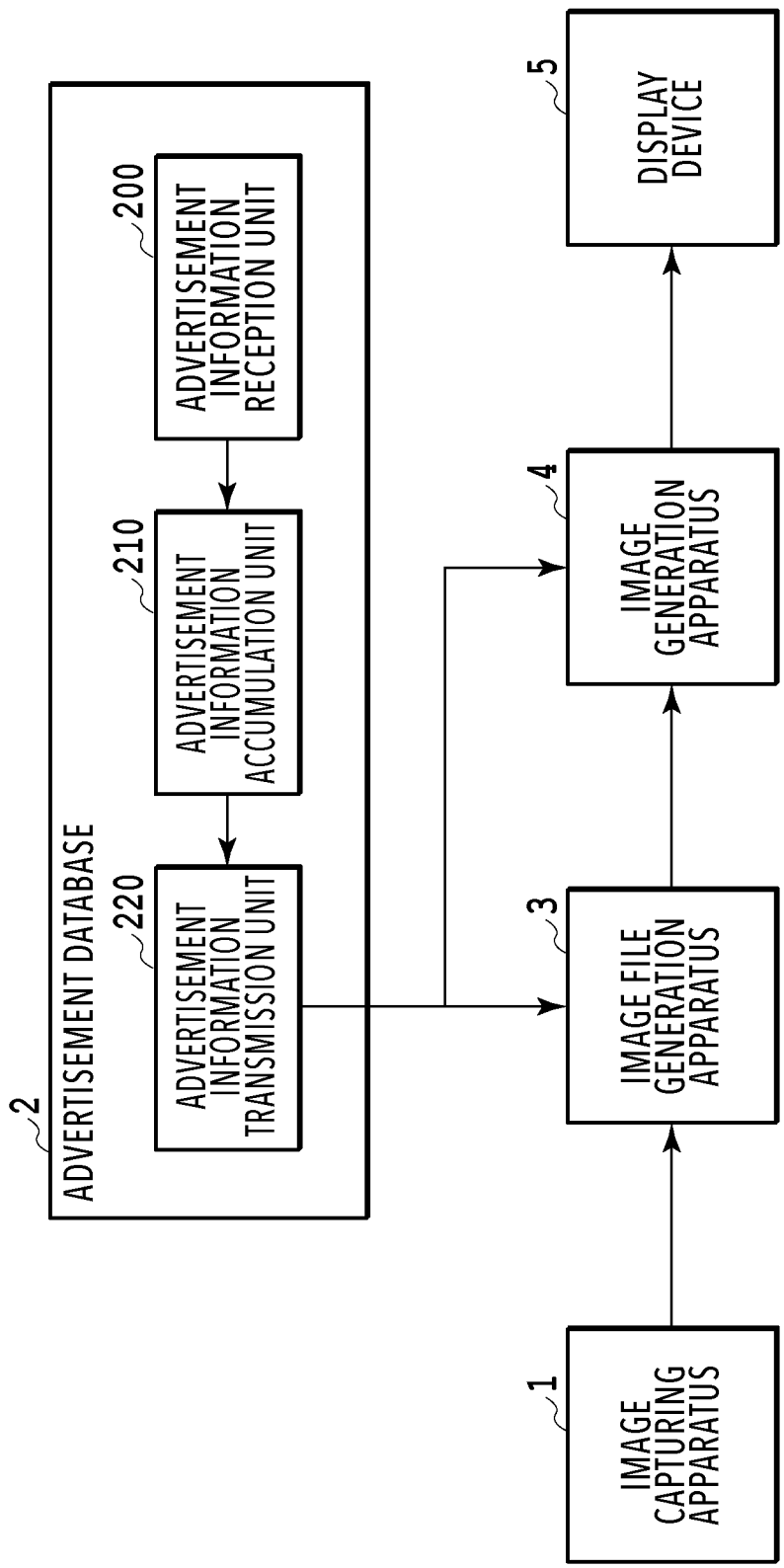
FIG. 2 is a diagram showing a configuration of an advertisement database.

Next, by using FIG. 2, the configuration of the advertisement database 2 is explained. As shown in FIG. 2, the advertisement database 2 comprises an advertisement information reception unit 200, an advertisement information accumulation unit 210, and an advertisement information transmission unit 220.

The advertisement information reception unit 200 receives virtual advertisement information from an advertiser or an advertisement creator requested by an advertiser to create an advertisement, not shown schematically, and transmits the virtual advertisement information to the advertisement information accumulation unit 210. The virtual advertisement information includes information on the advertisement ID, advertiser, advertisement creator, sports name, sports stadium name, game day, display time, display start time, display end time, expiration date, and the like. Further, the virtual advertisement information includes information on the advertisement model data, advertisement material data, display effect, virtual viewpoint dependence, advertisement paste area on virtual viewpoint image, priority, and the like.

The advertisement ID is an ID for identifying virtual advertisement information. The advertiser is a name identifying the owner of the virtual advertisement information. The advertiser is, for example, a team in a sports or a sports competition for which a virtual viewpoint image is generated, or a sponsor company of a program in which an virtual viewpoint image is broadcast, and the like. The advertisement creator is a name identifying a company or an individual who creates virtual advertisement information by being requested by the advertiser to create an advertisement. The sports name is a name identifying a sports, for example, such as soccer and baseball. The sports stadium name is a name for identifying the sports stadium. The game day is a day the game, such as soccer and baseball, takes place.

The display time is a time during which a virtual advertisement is displayed on the screen. The display start time is a time the display of a virtual advertisement starts, and the display end time is a time the display of the virtual advertisement ends. That is, the virtual advertisement is displayed during the display time from the display start time until the display end time. The expiration date is information relating to the final day the virtual advertisement is displayed. After this final day passes, the information relating to the virtual advertisement is not transmitted to the image file generation apparatus 3. The expiration date is, for example, specified by the advertiser or determined in accordance with the contact fee of the advertiser, or the like. Alternatively, the expiration date is determined by the setting by a user who views the virtual viewpoint image, the charging amount, or the like.

The advertisement model data and the advertisement material data are data relating to the shape information and the color information on the virtual advertisement that is actually displayed on the virtual viewpoint image. In the following, each piece of data is explained supplementally.

The advertisement model data is three-dimensional shape information on the virtual advertisement and created by a general CG modeling tool. The representation format is the same as a three-dimensional model used in computer graphics and the data format is a format that has generally prevailed, for example, the obj format. The advertisement model data may be data described in this format or may be path information on the file described in this format.

The advertisement material data is information indicating color data and texture data of the advertisement model and created by a general CG modeling tool like the advertisement model data. The data format is, for example, the mtl format. The advertisement material data may be data described in this format or may be path information on the file described in this format.

Figure 3:
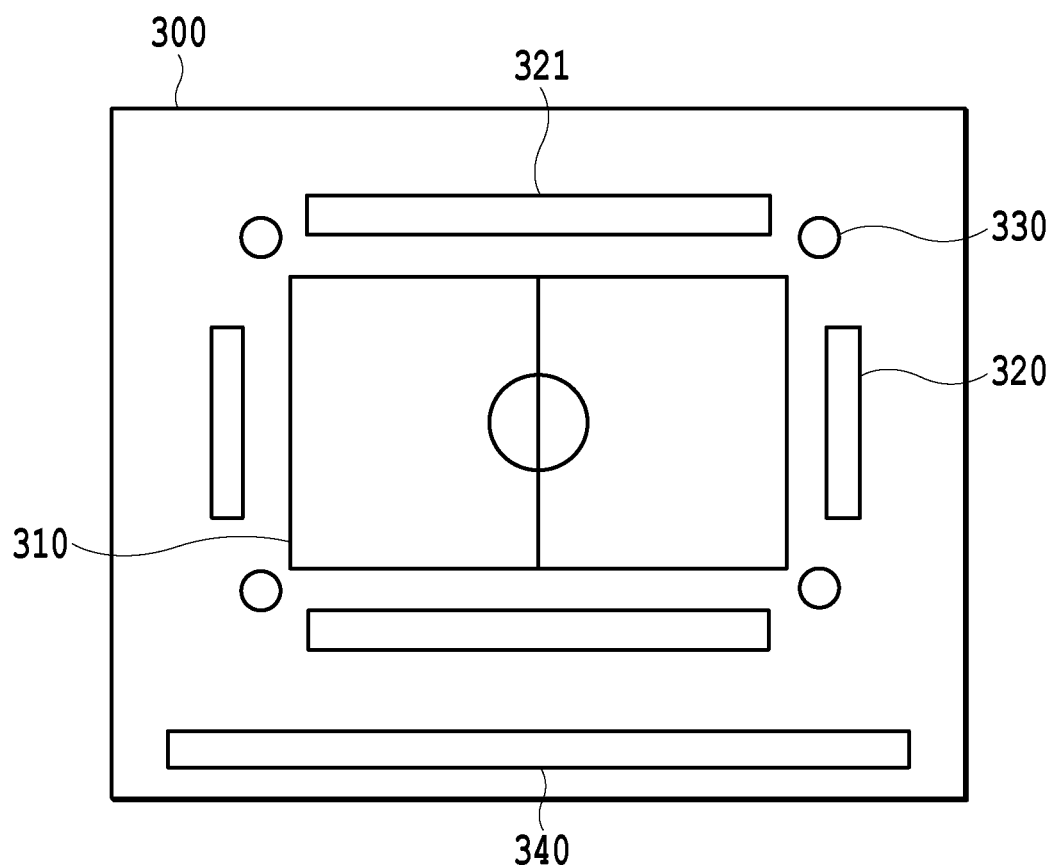
FIG. 3 is a diagram showing a GUI on which to set virtual advertisement model information.

In addition, it is also possible to register the advertisement model data and the advertisement texture data to the advertisement database 2 by operating, for example, a GUI as shown in FIG. 3 in place of the CG modeling tool.

In FIG. 3, symbol 300 simulates a display screen that is displayed on a display, not shown schematically, and symbol 310 simulates a soccer ground. Further, symbol 320 simulates a plate-shaped virtual sign installed along the goal line, symbol 321 simulates a plate-shaped virtual sign installed along the side line (tough line), and symbol 330 simulates a cylindrical virtual sign installed in the vicinity of the corner post.

It is possible for an advertiser or an advertisement creator to register advertisement model data in a geometric shape by selecting the virtual signs 320, 321, and 330 by an input device, not shown schematically. Further, it may also be possible to register an arbitrary advertisement model created by the above-described CG modeling tool so that the advertisement model is displayed at an arbitrary three-dimensional position around the ground 310. In addition, for example, it may also be possible to register advertisement texture data by inputting information indicating the storage location of the file of the advertisement image in a text box indicated by symbol 340.

The display effect is information relating to the display effect, such as an animation and blinking, in the virtual advertisement display. The virtual viewpoint dependence is information identifying a virtual viewpoint independent display in which the virtual advertisement is kept being displayed on the virtual viewpoint image even in a case where the virtual viewpoint is changed and a virtual viewpoint dependent display in which the virtual advertisement is no longer displayed in a case where the virtual viewpoint is changed and the advertisement model goes out of the viewing angle of the virtual camera.

Figure 4:
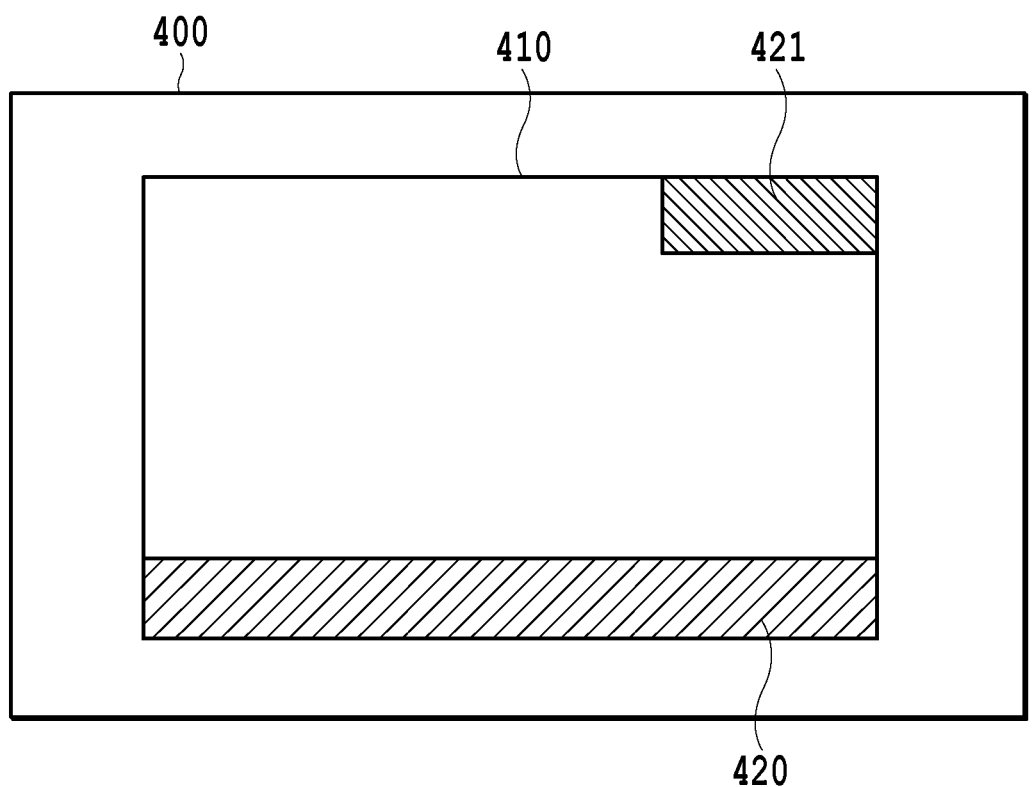
FIG. 4 is a diagram showing an advertisement paste area on a virtual viewpoint image.

In a case where the virtual viewpoint independent display is selected, the advertiser or the advertisement creator selects a position at which the virtual advertisement is displayed on the virtual viewpoint image by using, for example, a schematic diagram as shown in FIG. 4, or the like. In FIG. 4, symbol 400 indicates a screen on which the virtual viewpoint image is displayed, symbol 410 indicates an area in which the virtual viewpoint image is displayed, and symbol 420 and symbol 421 indicate advertisement paste areas on the virtual viewpoint image.

It is possible for the advertiser or the advertisement creator to select to display the virtual advertisement at the bottom of the virtual viewpoint image or to display the virtual advertisement at the top-right by selecting the advertisement paste area 420 or 421 on the virtual viewpoint image. The advertisement paste area on the virtual viewpoint image may be an area other than the areas indicated by symbol 420 and symbol 421. The priority is used for determining which advertisement is displayed with priority in a case where the displays of different advertisements overlap. The priority is determined, for example, in accordance with the advertisement fee.

Returning to FIG. 2, in a case of receiving virtual advertisement information from the advertisement information reception unit 200, the advertisement information accumulation unit 210 assigns the advertisement ID to the received virtual advertisement information and saves (accumulates) the virtual advertisement information in the database. It may be possible to construct the database by an already-existing method, such as SQL. Further, in this case, the above-described virtual advertisement information is saved in a table, but any definition may be accepted as long as it is possible to perform processing (operation), such as a search.

The advertisement information transmission unit 220 acquires virtual advertisement information from the advertisement information accumulation unit 210 in response to a request from the image file generation apparatus 3 and transmits the virtual advertisement information to the image file generation apparatus 3. In this case, the advertisement information accumulation unit 210 searches for virtual advertisement information from the database by using the above-described advertisement information (for example, advertisement ID or the like) as a key and further, transmits the searched virtual advertisement information to the advertisement information transmission unit 220.

Figure 5:
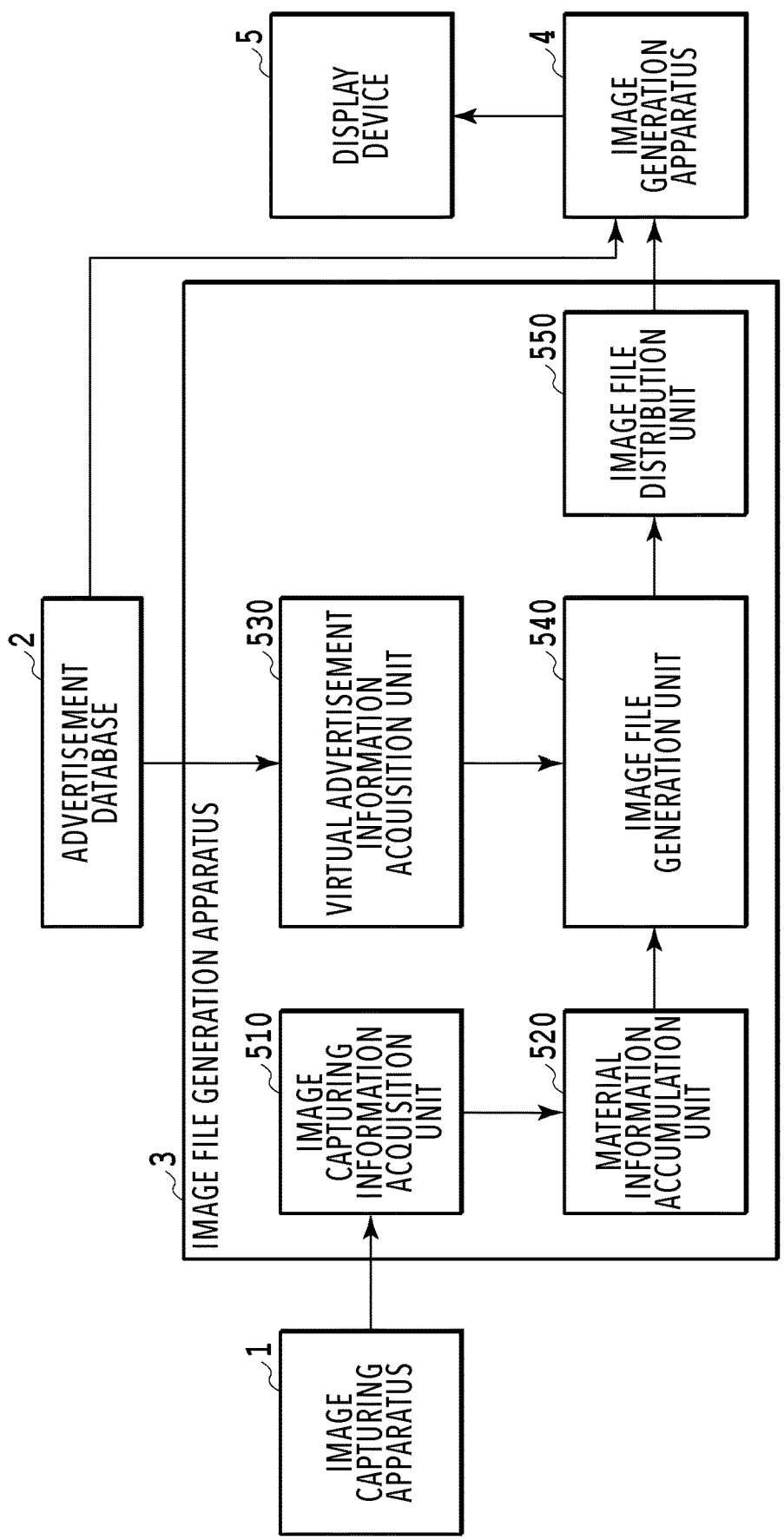
FIG. 5 is a diagram showing a configuration of an image file generation apparatus.

Next, the configuration of the image file generation apparatus 3 is explained by using FIG. 5. As shown in FIG. 5, the image file generation apparatus 3 comprises an image capturing information acquisition unit 510, a material information accumulation unit 520, a virtual advertisement information acquisition unit 530, an image file generation unit 540, and an image file distribution unit 550.

The image capturing information acquisition unit 510 acquires a plurality of captured images (a plurality of camera images) and camera parameters of all the actual cameras as image capturing information. All the actual cameras are synchronized by common (identical) time information and to the captured image, image capturing time information is assigned. It may also be possible to transmit camera parameters along with images or transmit camera parameters before image capturing or separately from images as needed.

The material information accumulation unit 520 comprises a material information acquisition unit and in a case of acquiring (receiving) a plurality of captured images and camera parameters of all the actual cameras from the image capturing information acquisition unit 510, the material information accumulation unit 520 saves (accumulates) them. The material information accumulation unit 520 further saves a three-dimensional model, such as a stadium, used at the time of generating a background image of a virtual viewpoint image as background model information. The format of the background model information may also be a format that has generally prevailed like the advertisement model and the advertisement texture of the virtual advertisement information and for example, the shape information is the obj format and the color information and the texture information are the mtl format.

The virtual advertisement information acquisition unit 530 acquires virtual advertisement information that is assigned to an image file from the advertisement database 2 and transmits the acquired virtual advertisement information to the image file generation unit 540. The image file generation unit 540 generates an image file for generating a virtual viewpoint image to which virtual advertisement information is assigned and transmits the generated image file to the image file distribution unit 550. To the image file, the camera parameters of all the actual cameras, a plurality of captured image at the time specified by a user, the background model information, and the virtual advertisement information are assigned. The image file distribution unit 550 distributes the image file to the image generation apparatus 4.

Here, a method of assigning the information in a case where the standard of the image file is the ISO/IEC 14496-12 (MPEG-4 Part 12) ISO base media format (hereinafter, ISO BMFF) standard is explained. In a case where described information has the same meaning, the format may be another description method.

In the following, first, the ISO BMFF standard is explained. In the ISO BMFF standard, an image file is configured by basic units called box. As shown in FIG. 6A, in each box, information relating to size, type, and data is stored.

Figure 6B:
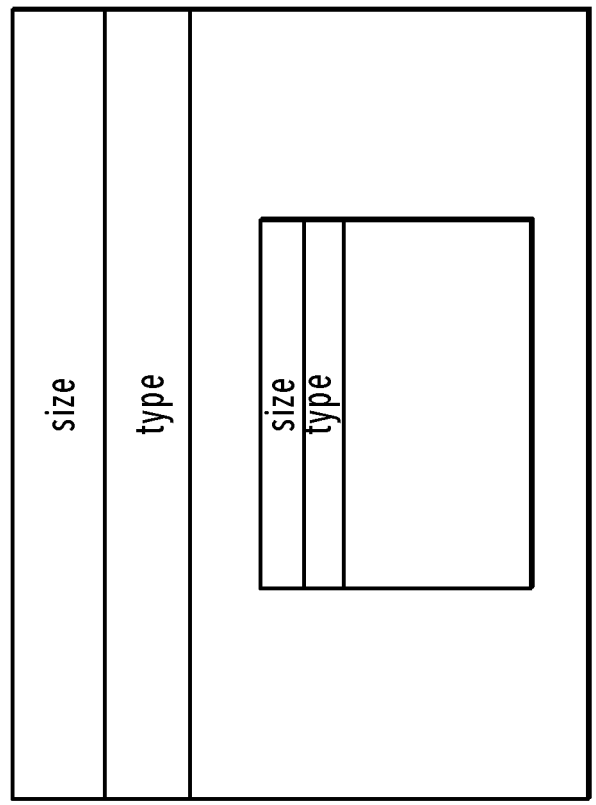
FIG. 6A and FIG. 6B are each a diagram showing a configuration of a box in the ISO BMFF standard.
Figure 6A:
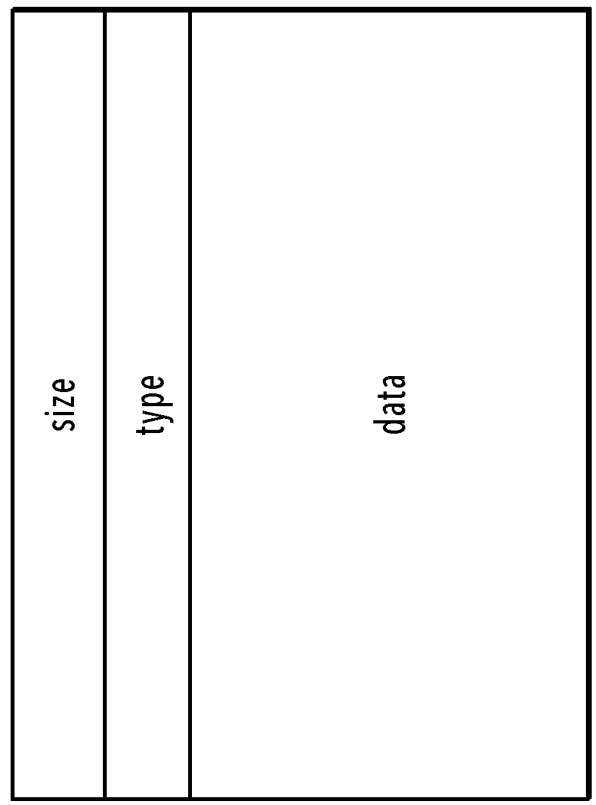

As for the box, as shown in FIG. 6B, it is also possible to store information in a nested structure. As the representative kinds of box, there are ftyp (File Type Compatibility Box), moov (Movie Box), meta, and the like.

The ftyp box is arranged at the top of a file and in the ftyp box, brand information indicating reproduction compatibility of a file is stored. In the moov box, the frame size of data, address information indicating the storage position, and head information, such as the image capturing time, are stored. As a supplement, the size of the moov box increases in proportion to the length of contents and the wait time until reproduction lengthens, and therefore, in the ISO BMFF standard, a moof box in the format in which header information is added for each unit obtained by dividing contents into arbitrary sections is also prepared. In the meta box, meta information is stored. In a case where the image file storing the information is analyzed, the moov box or the moof box are referred to and then, the storage address of the frame corresponding to a desired time is specified and further, based on the specified address, frame data is acquired.

Figure 7:
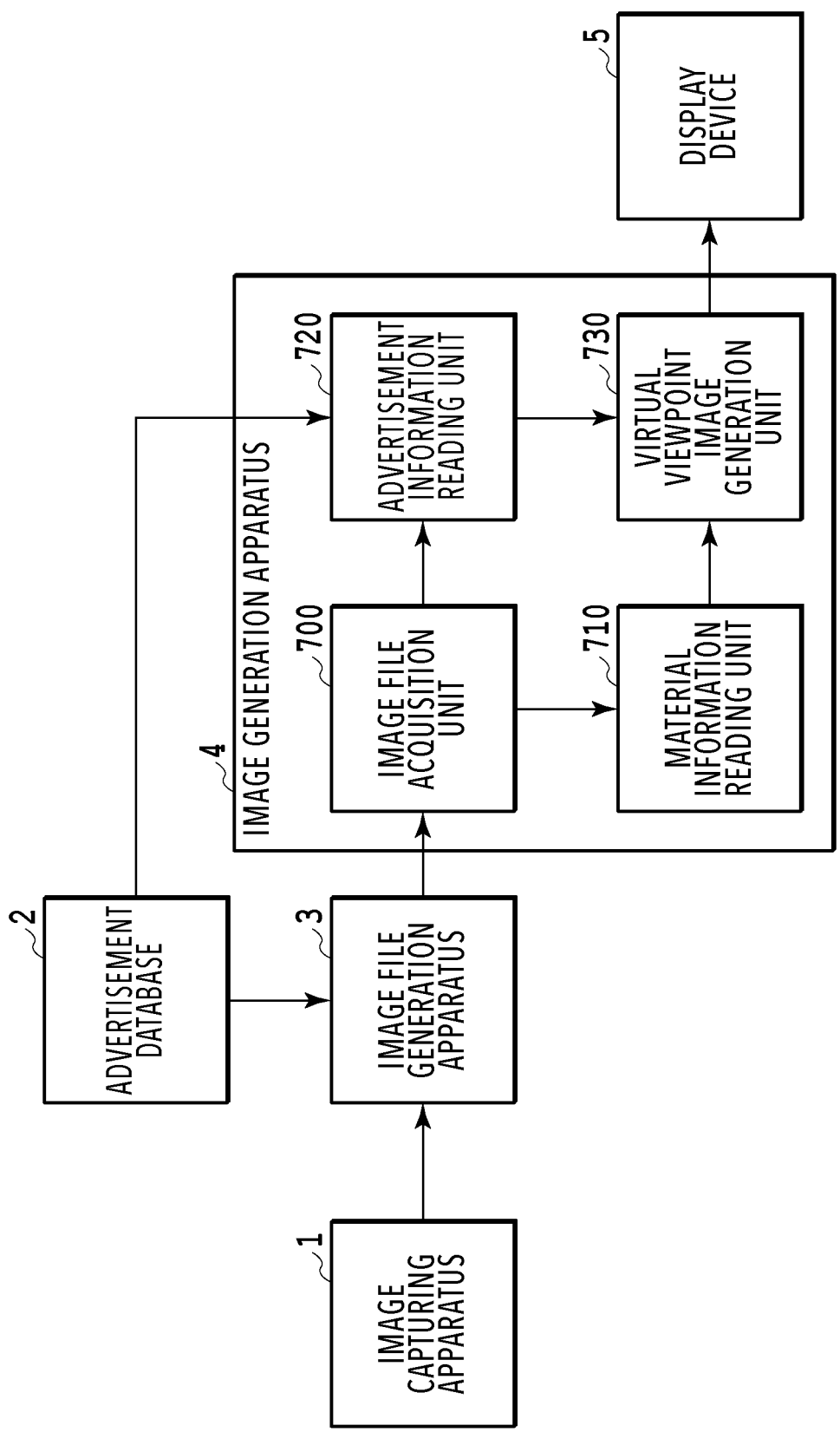
FIG. 7 is a diagram showing a configuration of an image generation apparatus.

Next, the configuration of the image generation apparatus 4 is explained by using FIG. 7. In a case of receiving an image file generated by the image file generation apparatus 3, the image generation apparatus 4 generates a virtual viewpoint image and further, transmits the generated virtual viewpoint image to the display device 5. As shown in FIG. 7, the image generation apparatus 4 comprises an image file acquisition unit 700, a material information reading unit 710, an advertisement information reading unit 720, and a virtual viewpoint image generation unit 730.

The image file acquisition unit 700 acquires an image file generated by the image file generation apparatus 3 and transmits the image file to the material information reading unit 710 and the advertisement information reading unit 720. The material information reading unit 710 analyzes the image file and reads camera parameters of all the actual cameras, a plurality of captured images, and background model information. The advertisement information reading unit 720 reads virtual advertisement information from the received image file and transmits the virtual advertisement information to the virtual viewpoint image generation unit 730.

The virtual viewpoint image generation unit 730 generates a virtual viewpoint image to which the virtual advertisement information is assigned by using the camera parameters of all the actual cameras, the plurality of captured images, the background model information, and the virtual advertisement information and transmits the virtual viewpoint image to the display device 5. The display device 5 receives the virtual viewpoint image having the virtual advertisement information, which is generated by the image generation apparatus 4, and outputs the virtual viewpoint image to a display, not shown schematically.

<Processing Flow>

Figure 8:
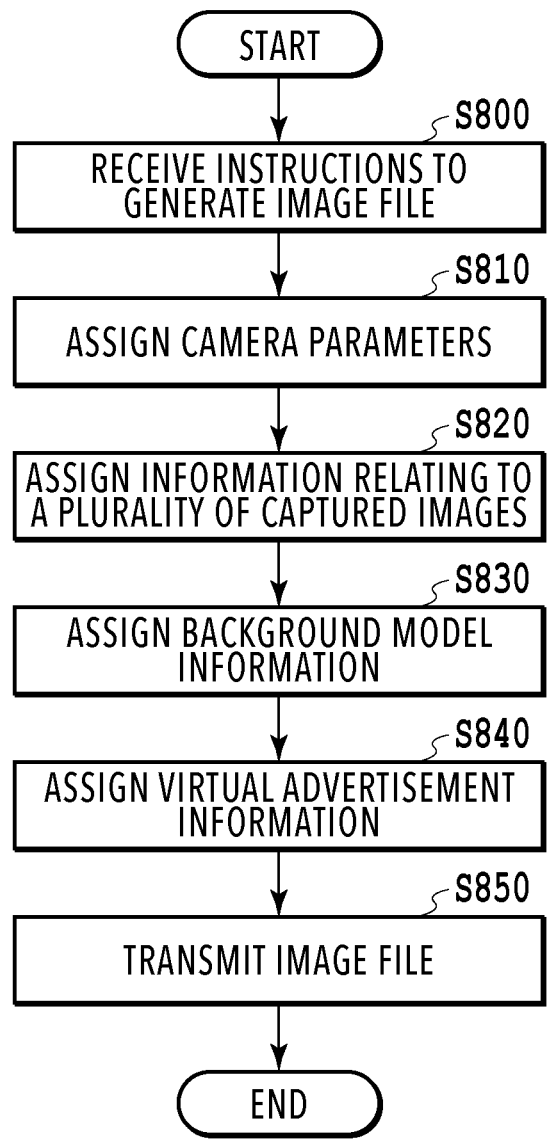
FIG. 8 is a flowchart showing a procedure of processing to assign various kinds of information to an image file.

Next, by using the flowchart in FIG. 8, a method of assigning the camera parameters of all the actual cameras, the plurality of captured images, the background model information, and the virtual advertisement information to the image file and the procedure of the processing thereof are explained. It is assumed that symbol "S" in explanation of the flowchart represents a step. This is also true with explanation of the subsequent flowcharts.

(S800)

At S800, the image file generation unit 540 of the image file generation apparatus 3 receives instructions to start formation of an image file and information on the start time and the end time of a virtual viewpoint image from a user, not shown schematically. In the following, the start time of the virtual viewpoint image is referred to as an image generation start time, but this is not the time at which generation of the virtual viewpoint image is started but the time of image capturing of a captured image that is used in a case where the virtual viewpoint image is generated. Further, the end time of the virtual viewpoint image is referred to an image generation end time, but this is the same as in the case with the image generation start time.

Specifically, first, the image file generation unit 540 distributes an image of an arbitrary actual camera saved in the material information accumulation unit 520 to a viewing environment, not shown schematically, so that it is possible for the user to specify a time at which the user desires to generate the virtual viewpoint image. Next, the image file generation unit 540 receives information relating to the image generation start time, the image generation end time, and the number of frames for which an image file is generated, which are input by the user. Upon receipt of the start time and the end time, the image file generation unit 540 generates an image file for generating a moving image. In a case where an image file for generating a still image is generated, the image file generation unit 540 receives only the start time and sets the number of frames to one.

Then, the image file generation unit 540 generates an image file. In this case, at the time of generating an image file for each frame, the image file generation unit 540 continues to generate, upon receipt of the information relating to the start time, an image file for each frame until receiving end instructions. Alternatively, at the time of generating an image file by collecting a plurality of frames, the image file generation unit 540 generates, upon receipt of the information relating to the start time and the end time, one image file in the meanwhile.

Further, upon receipt of instructions to start generation of an image file, the image file generation unit 540 describes, for example, a character string of fvpm as brand information in ftyp and explicitly indicates that information for virtual viewpoint image generation is saved in the image file.

(S810)

At S810, the image file generation unit 540 acquires camera parameters relating to each actual camera from the material information accumulation unit 520 and assigns the camera parameters to the image file. Here, by using FIG. 9, the format by which the camera parameter of the actual camera is described is explained supplementally.

The camera parameter is described in the meta box of the ISO BMFF standard. As shown in FIG. 9, in the meta information, information relating to data type and number of cameras is described. In data type, a character string of camera_parameter is described as information indicating a camera parameter. In number of cameras, the number of actual cameras is described.

In data information, external parameters and internal parameters corresponding to the number of actual cameras are described. For example, in a case where there are N actual cameras, the values of all the elements of a matrix representing the external parameters and the internal parameters of the first actual camera are described. Following this, the values of all the elements of a matrix representing the external parameters and the internal parameters of the second actual camera are described. After this, in ascending order, the external parameters and the internal parameters of the actual cameras are described similarly until the Nth actual camera is reached.

(S820)

At S820, the image file generation unit 540 acquires information relating to a plurality of captured images from the start time until the end time for generating a virtual viewpoint image from the material information accumulation unit 520 and assigns the information to the image file.

Here, by using FIG. 10, the format by which information relating to a plurality of captured images is described is explained supplementally.

In a case where an image file is generated by collecting a plurality of frames, information relating to a plurality of captured images is described as the moov box or the moof box of the ISO BMFF standard. In this case, in moov information or moof information, information on width of camera image, height of camera image, number of actual cameras, total number of frames of camera image, image capturing start time, and image capturing end time is described.

In a case of the moov box, in the data information, pixel information on the camera images of all the actual cameras is described for each frame. Further, in a case of the moof box, in the data information, information on the camera images of all the actual cameras corresponding to one frame is described in one file. In a case where an image file is generated for each frame, the image file generation unit 540 describes information similarly in the moof box.

(S830)

At S830, the image file generation unit 540 acquires background model information used at the time of generating a background image for generating a virtual viewpoint image from the material information accumulation unit 520 and assigns the information to the image file. Here, by using FIG. 11, the format by which background model information is described is explained supplementally.

The background model information is also described in the meta box of the ISO BMFF standard. In the meta information, information relating to data type is described. In data type, as information indicating background model information, a character string of background_model is described. In the data information, information (Obj file path) indicating the saving destination of file of the obj format of the background model and information (Mtl file path) indicating the saving information of the file of the mtl format are described. Alternatively, it may also be possible to describe the contents of these files as they are.

(S840)

At S840, the virtual advertisement information acquisition unit 530 acquires virtual advertisement information from the advertisement database 2 and transmits the virtual advertisement information to the image file generation unit 540. The image file generation unit 540 assigns the received virtual advertisement information to the image file. The virtual advertisement information acquisition unit 530 acquires the virtual advertisement information from the advertisement database 2 based on sports name, sports stadium name, game day, and expiration date.

In the following, specific explanation is given. In a case where a user activates the image file generation apparatus 3, the user registers information relating to the name of the sports that is captured, the name of the sports stadium, and the game day the sports takes place to the material information accumulation unit 520. The virtual advertisement information acquisition unit 530 acquires virtual advertisement information relating to the same game day as that of the information relating to the game day registered in the material information accumulation unit 520, the same sports name as that of the information, and the same sports stadium name as that of the information from the advertisement database 2. In this case, the virtual advertisement information whose expiration date has passed is not acquired.

Next, by using FIG. 12, the format by which the image file generation unit 540 assigns virtual advertisement information to an image file is explained supplementally. The virtual advertisement information is also described in the meta box of the ISO BMFF standard. In the meta information, information relating to data type, number of advertisements, data size of each piece of advertisement information, and address of advertisement database is described.

In data type, as information indicating virtual advertisement information, a character string of virtual_advertising is described. In number of advertisements, the number of assigned advertisements is described. In data size, the data size of the advertisement is described for each advertisement (corresponding to the number of advertisements). In address of advertisement database, as address information for connecting to the advertisement database 2, for example, URL or the like is described.

In a case where there is no information on address of advertisement database, in the data information, as advertisement information, advertisement ID, advertiser, advertisement creator, sports name, sports stadium name, game day, display time, display start time, and display end time are described. Further, in the data information, as advertisement information, information on expiration date, advertisement model data, advertisement material data, display effect, virtual viewpoint dependence, advertisement paste area on virtual viewpoint image, and priority is described. Further, in a case where there is information on address of advertisement database (that is, in a case where URL is described in address of advertisement database), in the data information, only advertisement ID is described. In a case where only advertisement ID is described as above, in displaying virtual advertisement information, the advertisement database 2 is accessed by using the address information and the virtual advertisement information on advertisement ID is acquired.

(S850)

At S850, the image file generation unit 540 transmits the generated image file to the image file distribution unit 550. Then, the image file distribution unit 550 distributes the image file to the image generation apparatus 4. That is, the image file generation unit 540 generates an image file including the camera parameters, the information relating to the captured image, the background model information, and the virtual advertisement information, which are acquired at S810 to S840. The image file is generated for each frame based on the information relating to the start time received at S800. Further, in a case where an image file is generated based on the information relating to the start time and the end time received at S800, the image file is generated as an image file having data indicating the image of one frame, which corresponds to a plurality of collected frames.

Figure 13:
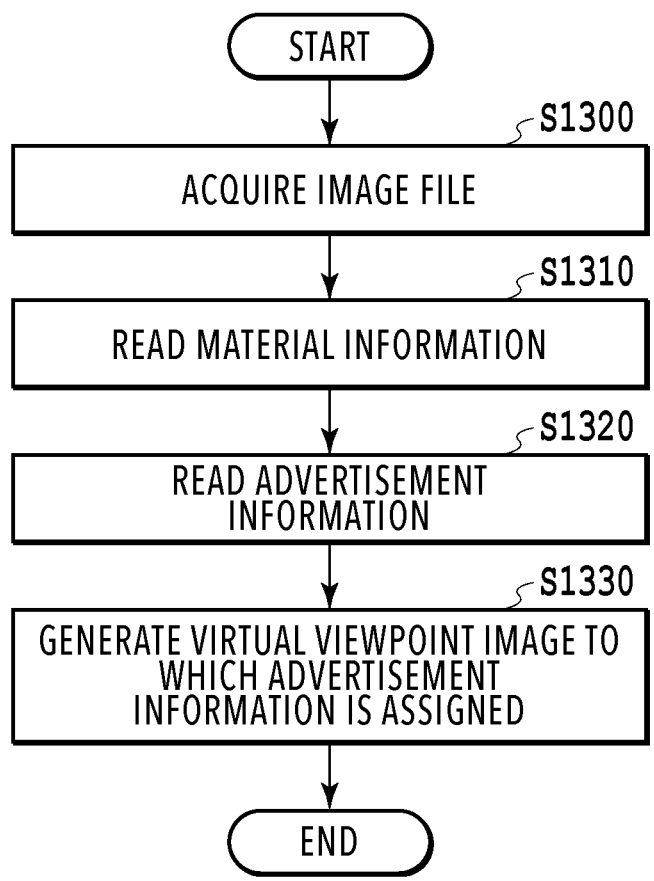
FIG. 13 is a flowchart showing a procedure of processing to generate a virtual viewpoint image to which virtual advertisement information is assigned.

Following the above, by using the flowchart in FIG. 13, the method of generating a virtual viewpoint image to which virtual advertisement information is assigned by using the above-described image file and the procedure of the processing thereof are explained.

(S1300)

At S1300, the image file acquisition unit 700 of the image generation apparatus 4 acquires an image file from the image file generation apparatus 3. Then, the image file acquisition unit 700 analyzes the image file and reads the kind of image file, the camera parameters of all the actual cameras, the plurality of captured images, the background model information, and the virtual advertisement information. First, a viewer, not shown schematically, selects to generate an image file by collecting a plurality of frames or to generate an image file for each frame.

In a case of generating an image file by collecting a plurality of frames, the viewer sets the start time and the end time of a scene for which a virtual viewpoint image is generated. In order to set the start time and the end time, the image file acquisition unit 700 acquires an arbitrary actual camera image at the time specified by the viewer from the image file generation apparatus 3 and displays the actual camera image on a display or the like, not shown schematically. The viewer sets the start time and the end time of the scene for which a virtual viewpoint image is generated while watching the displayed image.

The image file acquisition unit 700 transmits instructions to start image file generation by the viewer and the information relating to the start time and the end time to the image file generation apparatus 3 and receives the image file to which virtual advertisement information is assigned, which is generated by the image file generation apparatus 3. Then, the image file acquisition unit 700 transmits the received image file to the material information reading unit 710 and the advertisement information reading unit 720.

Further, in a case where an image file is generated for each frame, the image file acquisition unit 700 transmits instructions to start image file generation by the viewer and the information relating to the start time and receives the image file to which virtual advertisement information is assigned, which is generated by the image file generation apparatus 3. The image file acquisition unit 700 keeps receiving the generated image file until transmitting end instructions and transmits the received image file to the material information reading unit 710 and the advertisement information reading unit 720.

(S1310)

At S1310, the material information reading unit 710 scans the image file and checks that the character string described in the ftyp box is fvpm. In a case where the character string described in the ftyp box is not fvpm, the material information reading unit 710 aborts reading of the file and in a case where the character string described in the ftyp box is fvpm, the material information reading unit 710 continues to read the file.

The material information reading unit 710 scans the image file and in a case where the kind of box is the meta box and the character string described in data type of the meta information is camera_parameter, the material information reading unit 710 reads the camera parameters of the actual camera. In this case, the material information reading unit 710 reads the number of actual cameras from the meta information and reads the external parameters and the internal parameters corresponding to the number of actual cameras from the data information.

Further, the material information reading unit 710 scans the image file and in a case where the kind of box is the moov box or the moof box, the material information reading unit 710 reads the information relating to the plurality of captured images. The information relating to the width and height of the image, the number of cameras, and the number of frames, which is used for reading multi-camera image information, is acquired from the moov box or the moof box. The material information reading unit 710 cuts out the number of images corresponding to the number of cameras for each frame from the data information, which corresponds to the number of pixels (that is, image width×height), and reads the multi-camera image information.

In a case of completing reading of the multi-camera image information, the material information reading unit 710 generates an object model used for generation of a virtual viewpoint image based on the multi-camera image information. The object model includes shape information and color information. Further, the processing to generate these pieces of information mainly includes processing to estimate a three-dimensional shape of the object model and processing to estimate the color of the three-dimensional shape. In the following, each piece of processing is explained.

In order to estimate the three-dimensional shape of the object model, first, the material information reading unit 710 estimates the object area from each actual camera image. This object area is estimated by, for example, a general method, such as a background difference method in which a difference from the background image captured in advance is calculated from the captured image obtained by capturing the object model and the area whose difference is more than or equal to a predetermined threshold value is estimated as the object area.

Then, the material information reading unit 710 estimates the three-dimensional shape of the object model by using the object areas and the camera parameters of all the actual cameras. For estimation of the three-dimensional shape, for example, the Visual Hull method or the like is used. In the present embodiment, this shape of the object model is represented by a three-dimensional point cloud (set of points having three-dimensional coordinates).

Following the above, the color of each point configuring the three-dimensional point cloud is estimated. In order to estimate the color, first, a distance image is generated in which the distance from the actual camera to the object surface is taken to be the distance. Next, for each point, the distance value acquired by performing conversion into each camera coordinate system is compared with the pixel value (distance) of the pixel projected onto the distance image and in a case where the difference is less than or equal to a predetermined threshold value, it is determined that the point is viewed from the actual camera. Then, in all the cameras from which it is determined that the point is viewed, the color of the pixel of the projection destination is calculated and the calculated average of the pixel colors is estimated as the color of the point. By the above processing, it is possible to acquire the object model whose each point is colored.

Further, the material information reading unit 710 scans the image file and in a case where the kind of box is the meta box and the character string described in data type of the meta information is background_model, the material information reading unit 710 reads the background model information. In this case, the material information reading unit 710 acquires the background model information (shape information on the background model and color information on the background model) by reading the paths of the obj format file and the mtl format file described in the data information.

The shape information on the background model is acquired by reading the obj format file. Further, the color information on the background model is acquired by reading the mtl format file. In a case where there is no mtl format file of the background model, it may also be possible to generate texture that is mapped to the background model from the background image and take the texture as color information. In order to generate texture, first, the normal to each surface is calculated based on the shape information on the background model and the actual camera that faces most squarely is selected by comparing the calculated normal to each surface and the orientation of the actual camera. Then, the three vertexes configuring the surface are projected onto the background image of the actual camera and the image within the triangle formed by the three vertexes is taken as the texture of each surface.

In a case where reading of material information is completed and further, estimation of the shape information and the color information on the object model is completed, the material information reading unit 710 transmits the external parameters and the internal parameters of the actual camera, the plurality of captured images, the object model, and the information on the background model to the virtual viewpoint image generation unit 730.

(S1320)

At S1320, the advertisement information reading unit 720 scans the image file and reads the virtual advertisement information, and transmits the advertisement model data to the virtual viewpoint image generation unit 730. First, the advertisement information reading unit 720 checks that the character string described in the ftyp box is fvpm. The advertisement information reading unit 720 aborts reading of the file in a case where the character string described in the ftyp box is not fvpm and continues to read the file in a case where the character string described in the ftyp box is fvpm.

The advertisement information reading unit 720 scans the image file and reads the virtual advertisement information in a case where the kind of box is the meta box and the character string described in data type of the meta information is virtual_advertising. In a case where there is no information on address of advertisement database in the meta information, the advertisement information reading unit 720 reads information on advertisement ID, advertiser, advertisement creator, sports name, sports stadium name, game day, display time, display start time, display end time, and expiration date described in the data information as the virtual advertisement information. Further, the advertisement information reading unit 720 reads information on advertisement model data, advertisement material data, display effect, virtual viewpoint dependence, advertisement paste area on virtual viewpoint image, and priority described in the data information as the virtual advertisement information. Furthermore, in a case where URL of the advertisement database is described in address of advertisement database, the advertisement information reading unit 720 accesses the advertisement database 2 with the URL and acquires the virtual advertisement information on advertisement ID described in the data information.

After reading the virtual advertisement information in this manner, the advertisement information reading unit 720 generates the advertisement model data. Like the object model and the background model, the advertisement model also includes shape information and color information. The shape of the advertisement model is acquired by reading the obj format file obtained as the advertisement model data. Further, the color information on the advertisement model is acquired by reading the mtl format file obtained as the advertisement material data.

(S1330)

At S1330, the virtual viewpoint image generation unit 730 generates a virtual viewpoint image to which advertisement information is assigned by using information relating to the camera parameters of all the actual cameras, the plurality of captured images, the object model, the background model, the advertisement model, and the parameters of the virtual camera. The virtual viewpoint image generated by the image generation apparatus 4 is transmitted to the display device 5 and displayed on a display or the like. The parameters of the virtual camera may be the same as those of an arbitrary actual camera and an arbitrary viewpoint position, line-of-sight vector, and viewing angle may be set.

In the following, a method of generating a virtual viewpoint image (generation method of a virtual viewpoint image) from the above-described information is explained supplementally. Here, the generation method of a virtual viewpoint image is changed in accordance with the information relating to the virtual viewpoint dependence of the advertisement information.

In a case where the display method depends on the virtual viewpoint, by performing rendering of the background model, the object model, and the advertisement model by a general CG method, it is possible to generate a virtual viewpoint image. In addition, in a case where as the display effect of the advertisement information, for example, "blinking display, display interval n frames" or the like is set, it is possible to generate an image that simulates the blinking effect by aborting rendering of the advertisement model for every n frames of the virtual viewpoint image. In a case of the display method that depends on the virtual viewpoint, the virtual advertisement model outside the viewing angle of the virtual camera is not displayed on the virtual viewpoint image.

Further, in a case where the display method does not depend on the virtual viewpoint, it is possible to generate a virtual viewpoint image by pasting the texture of the virtual advertisement model to the advertisement paste area on the virtual viewpoint image obtained by performing rendering of the background model and the object model. The display of the virtual advertisement information is started from the time after the display start time acquired as the advertisement information elapses relatively from the image generation start time of the scene for which the virtual viewpoint image is generated, which is set by a viewer at S1300, and the virtual advertisement information is displayed until the image generation end time is reached, that is, during the time corresponding to the display time.

In a case where the display start time is not set, the display is started from the image generation start time and in a case where the display end time is not set, the display is continued until the image generation end time is reached. In a case where the display time is not set, the display is continued from the display start time to the display end time. Further, in a case where the generation day of the virtual viewpoint image in the image file is after the expiration date of the virtual advertisement information passes, the virtual advertisement information is not displayed. In this case, on a condition that there is another piece of virtual advertisement information within the expiration date, only the virtual advertisement information within the expiration date is displayed and on a condition that there is no advertisement information within the expiration date, a virtual viewpoint image with no virtual advertisement display is displayed. In addition, in a case where virtual advertisements of different advertisers overlap on one virtual viewpoint image, by using priority acquired as virtual advertisement information, the virtual advertisement with high priority is displayed preferentially.

Further, in a case of generating a virtual viewpoint image at the next time, the image generation apparatus 4 returns the processing to S1310 and generates a virtual viewpoint image at the new time and transmits the virtual viewpoint image to the display device 5.

As explained above, it is possible for the image file generation apparatus 3 of the present embodiment to generate an image file for viewing a virtual viewpoint image at the specified time. Further, it is possible to assign virtual advertisement information to the image file. Furthermore, it is possible for the image generation apparatus 4 to generate and display a virtual viewpoint image to which virtual advertisement information is assigned by acquiring an image file to which virtual advertisement information is assigned from the image file generation apparatus 3. In a case where an image file to which virtual advertisement information is assigned is generated by the image file generation apparatus 3 of the present embodiment, there is an effect as follows. For example, in a case where an advertiser or a user desires to search for a virtual viewpoint image to which an advertisement of a specific company or the like is assigned, it is possible to easily search for the virtual viewpoint image by using the information included in the virtual advertisement information. Further, the virtual advertisement information and the material information are included in one file, and therefore, the processing relating to a call of data is simplified compared to a case where the virtual advertisement information and the material information are acquired separately.

In the present embodiment, the procedure of the processing is not necessarily limited to this and for example, it may also be possible to perform the processing to acquire the material information and the processing to acquire the virtual advertisement information by reversing the order. Further, it may also be possible to encrypt the virtual advertisement information on the image file by an already-existing encryption method.

Second Embodiment

In the first embodiment described above, in order to generate texture of the background model, a plurality of captured images is used. However, in the plurality of captured images (actual camera images), players are brought in focus but the image of the area in which a sign is arranged is an image not so well focused.

Consequently, in the present embodiment, a method is explained in which the image of an actual sign area of a virtual viewpoint image is displayed clearly by assigning actual advertisement information to an image file as additional information and making use of the actual advertisement information also at the time of background model generation. The actual advertisement in the present embodiment refers to an existing sign or display that is installed in a sports stadium or a stadium, which is a real space. In the following embodiment, an example is explained in which actual advertisement information is assigned to an image file as additional information that is made use of at the time of background model generation, but the additional information that is assigned is not limited to actual advertisement information. Additional information may be, for example, information relating to a cheering flag that is installed in the real space, or the like.

<System Configuration>

Figure 14:
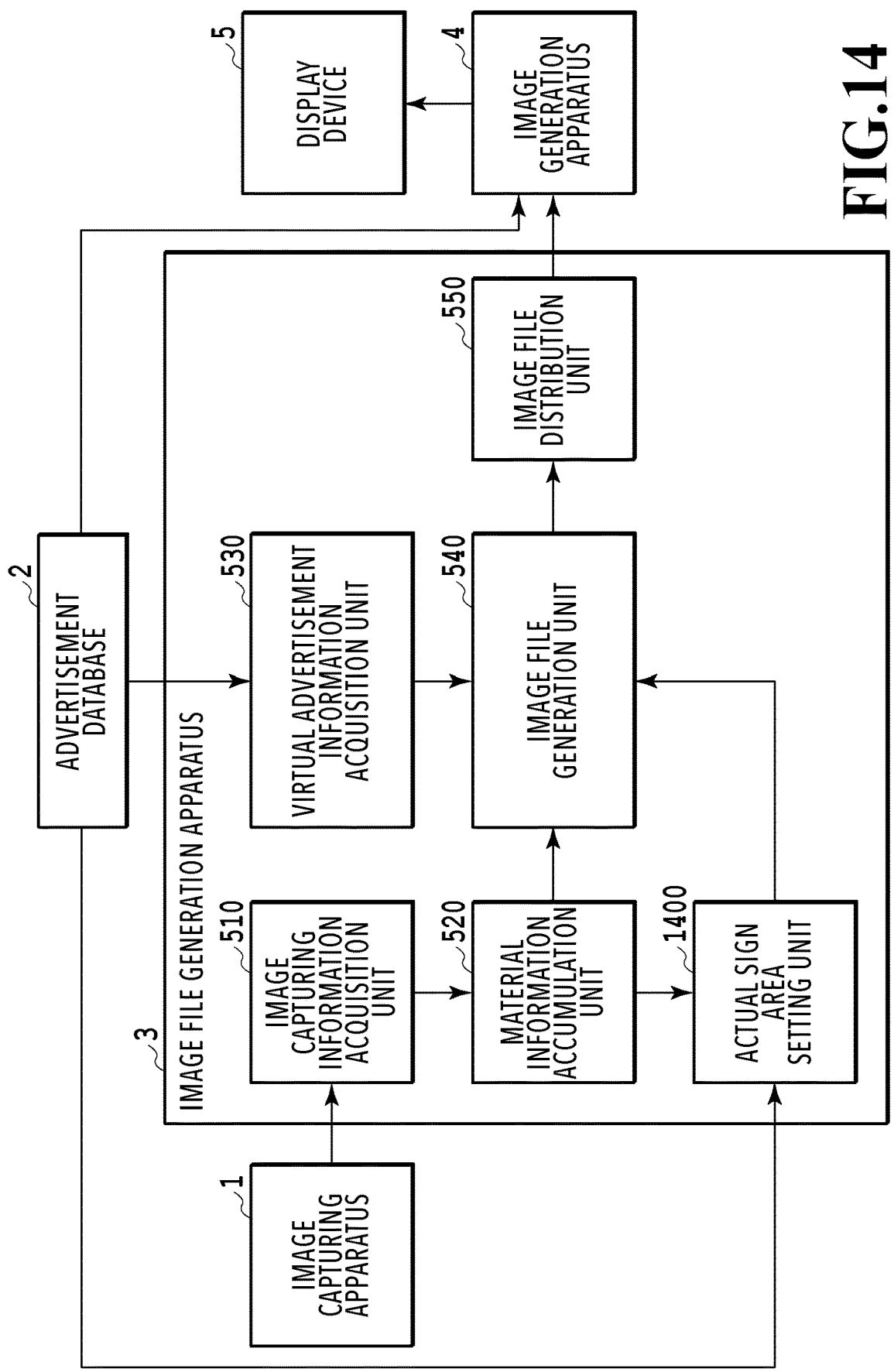
FIG. 14 is a diagram showing a configuration of an image file generation apparatus.

FIG. 14 is a diagram showing a configuration of an image generation system according to the present embodiment. As shown in FIG. 14, the image generation system according to the present embodiment comprises the image capturing apparatus 1, the advertisement database 2, the image file generation apparatus 3, the image generation apparatus 4, and the display device 5. In the present embodiment, the configuration of the image capturing apparatus 1 and the display device 5 is the same as the configuration of the above-described first embodiment.

The image file generation apparatus 3 further comprises an actual sign area setting unit 1400 other than the image capturing information acquisition unit 510, the material information accumulation unit 520, the virtual advertisement information acquisition unit 530, the image file generation unit 540, and the image file distribution unit 550 described above. In relation to this, to the image file generation unit 540, processing to assign actual advertisement information is added. The configuration of the advertisement database 2 and the image generation apparatus 4 is the same as the configuration of the above-described first embodiment, but the operation of each unit is different from that of the above-described first embodiment because actual advertisement information is controlled.

In the present embodiment, the actual advertisement information is information on advertisement ID, advertiser, advertisement creator, sports name, sports stadium name, game day, actual advertisement image, actual camera ID, actual sign area, and the like. Here, actual advertisement image is an image, such as a company logo, and the same image as the design of the sign installed actually and actual sign area information is a label image indicating the sign area in each actual camera image. It is assumed that the image size is the same as that of the actual camera image and the label value of each pixel corresponds to advertisement ID. For example, it is assumed that the label value 0 is background, the label value 1 is advertisement ID1, and the label value 2 is advertisement ID2. That is, it is assumed that a set of the label value 1 is the sign area of advertisement ID1. Further, advertisement ID and advertiser are associated with each other in the advertisement database 2.

Information other than the information on actual sign area is registered to the advertisement database 2 by an advertiser or an advertisement creator, which is not shown schematically, before an image file is generated. Further, the actual sign area information is set by the actual sign area setting unit 1400

<Processing Flow>

Figure 15:
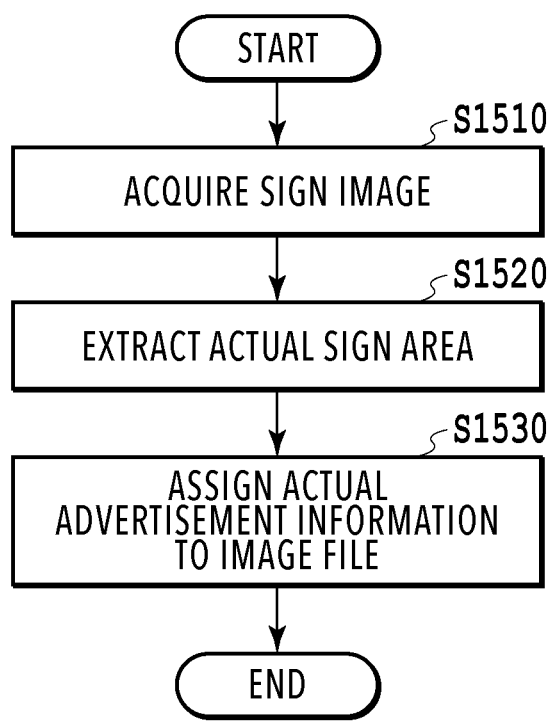
FIG. 15 is a flowchart showing a procedure of processing to assign actual advertisement information to an image file.

Next, a method of assigning actual advertisement information to an image in accordance with the ISO BMFF standard and a procedure of the processing thereof are explained by using a flowchart in FIG. 15.

(S1510)

At S1510, the image capturing information acquisition unit 510 acquires a plurality of captured images of a sign actually installed in the sports stadium and saves (accumulates) in the material information accumulation unit 520.

(S1520)

At S1520, the actual sign area setting unit 1400 acquires the plurality of captured images from the material information accumulation unit 520 and extracts the actual sign areas from the camera images of all the actual cameras. Then, the actual sign area setting unit 1400 transmits actual sign area information to the image file generation unit 540.

Further, it is possible to extract the actual sign area by, for example, a template matching method. In this case, the actual sign area setting unit 1400 first acquires the actual sign information on the advertiser who has installed the actual sign in the sports stadium from the advertisement database 2 based on sports stadium name and game day. Next, the actual sign area setting unit 1400 extracts a similar image area from the camera image of the actual camera by using the actual advertisement image including in the actual advertisement information as a template and extracts the similar image area as the actual sign area in the actual camera.

Here, extraction of the actual sign area by template matching is explained, but it is also possible to manually extract an arbitrary area of the image by using an input device, such as a mouse, and take the area as the actual sign area. The actual advertisement information including the actual sign area information is transmitted to the image file generation unit 540.

(S1530)

At S1530, the image file generation unit 540 generates an image file to which actual advertisement information is also assigned and transmits the image file to the image file distribution unit 550. Here, by using FIG. 16, the format by which actual advertisement information is described is explained supplementally.

Actual advertisement information is also described as the meta box of the ISO BMFF standard. In the meta information, information relating to data type and advertiser table is described. In data type, as information indicating actual advertisement information, a character string of actual_advertising is described. In advertiser table, a correspondence between the label value of actual sign area and advertisement ID is described. In the data information, as actual advertisement information, information on advertisement ID, advertiser, advertisement creator, sports name, sports stadium name, game day, actual advertisement image, camera ID corresponding to the number of cameras, actual sign area, and priority.

Following the above, by using the above-described image file, a method of generating a virtual viewpoint image that makes use of actual advertisement information and a procedure of the processing thereof are explained. First, like S1300 of the first embodiment, the image file acquisition unit 700 acquires an image file from the image file generation apparatus 3. Then, the image file acquisition unit 700 transmits the received image file to the material information reading unit 710 and the advertisement information reading unit 720.

The processing of the material information reading unit 710 is the same as that at S1310, but in a case where there is actual advertisement information, the processing to generate color information on the background model is different. In the following, this processing is explained supplementally, but first, the processing to read actual advertisement information is explained. First, the material information reading unit 710 scans the image file and checks that the character string described in the ftyp box is fvpm.

The material information reading unit 710 aborts reading of the file in a case where the character string described in the ftyp box is not fvpm and continues reading of the file in a case where the character string described in the ftyp box is fvpm. The material information reading unit 710 scans the image file and in a case where the kind of box is the meta box and the character string described in data type of the meta information is actual_advertising, reads actual advertisement information. In this case, the material information reading unit 710 reads information on advertisement ID, advertiser, advertisement creator, sports name, sports stadium name, game day, actual advertisement image, and actual sign area of all the actual cameras, which are described in the data information.

The color information on the background model in a case where there is actual advertisement information is generated by using the actual advertisement image. First, the material information reading unit 710 calculates the normal to each surface based on the shape information on the background model and selects the actual camera that faces most squarely by comparing the calculated normal to each surface and the orientation of the actual camera. Then, the three vertexes configuring the surface are projected onto the camera image of the actual camera and in a case where the three vertexes are located within the actual sign area, the three vertexes are projected onto the advertisement image and the image within the triangle is taken as the texture of the surface. By performing this processing on all the surfaces of the background model, it is possible to generate the color information on the background model that makes use of the advertisement image.

Like S1320, the advertisement information reading unit 720 scans the image file and reads virtual advertisement information and transmits the virtual advertisement information to the virtual viewpoint image generation unit 730. Like S1330, the virtual viewpoint image generation unit 730 generates a virtual viewpoint image to which advertisement information is assigned by using the information on the camera parameters of the actual cameras, the object model, the background model generated from the actual advertisement information, and the virtual advertisement model. The generated virtual viewpoint image is transmitted to the display device 5 and displayed on a display or the like.

By the present embodiment, it is possible for a user, not shown schematically, to acquire an image file to which actual advertisement information is also assigned. Further, it is possible to make clear the actual sign image on the virtual viewpoint image by acquiring the actual advertisement information based on the image file and generating the background model by using the actual advertisement image.

Third Embodiment

In the above-described second embodiment, the method of making clear the actual sign image on the virtual viewpoint image by using the actual advertisement information is explained. However, with this method, there is a case where a virtual advertisement image is displayed on the actual sign area.

Consequently, in the present embodiment, a method is explained that performs control so that a virtual advertisement image is not displayed on the actual sign area by using virtual viewpoint virtual advertisement information and actual advertisement image, both assigned to an image file. Due to this, an advertiser is no longer deprived of a chance of advertising by a different advertiser. Further, in a case where the advertiser of the virtual advertisement and the advertiser of the actual advertisement are the same advertiser, it is possible to increase the chance of advertising.

<System Configuration>

The configuration of an image generation system according to the present embodiment is the same as that of the above-described second embodiment. However, the operation of the virtual viewpoint image generation unit 730 in the image generation apparatus 4 is different from that of the above-described second embodiment. In the following, the operation of the virtual viewpoint image generation unit 730 is explained.

In a case of receiving both virtual advertisement information and actual advertisement information, the virtual viewpoint image generation unit 730 operates as follows. As explained in the above-described second embodiment, first, the virtual viewpoint image generation unit 730 determines whether or not each surface of the background model is included in the actual sign area. Next, the virtual viewpoint image generation unit 730 calculates the actual sign area on the virtual viewpoint image by projecting the surface included in the actual sign area of the background model onto the virtual viewpoint. Further, the virtual viewpoint image generation unit 730 calculates the virtual advertisement image on the virtual viewpoint image by projecting the virtual advertisement model onto the virtual viewpoint.

Then, in a case where the actual sign area and the virtual advertisement area overlap, the overlap of the actual sign and the virtual sign is avoided by shifting the virtual advertisement area to the outside of the rectangle surrounding the actual sign area. Alternatively, it may also be possible to preferentially display advertisement whose priority included in the advertisement information is high. Further, by calculating the object area on the virtual viewpoint image by projecting the object model onto the virtual viewpoint image and determining the overlap of the object area and the virtual advertisement area or the actual sign area, it is also possible to perform control so that the object area and the advertisement area do not overlap on the virtual viewpoint image.

By the present embodiment, in a case where virtual advertisement information and actual advertisement information are assigned to an image file, it is possible to prevent the virtual advertisement image from being displayed on the actual sign area. Due to this, it is possible to display the advertisement without depriving the advertisers of the respective chances of advertising.

Figure 17:
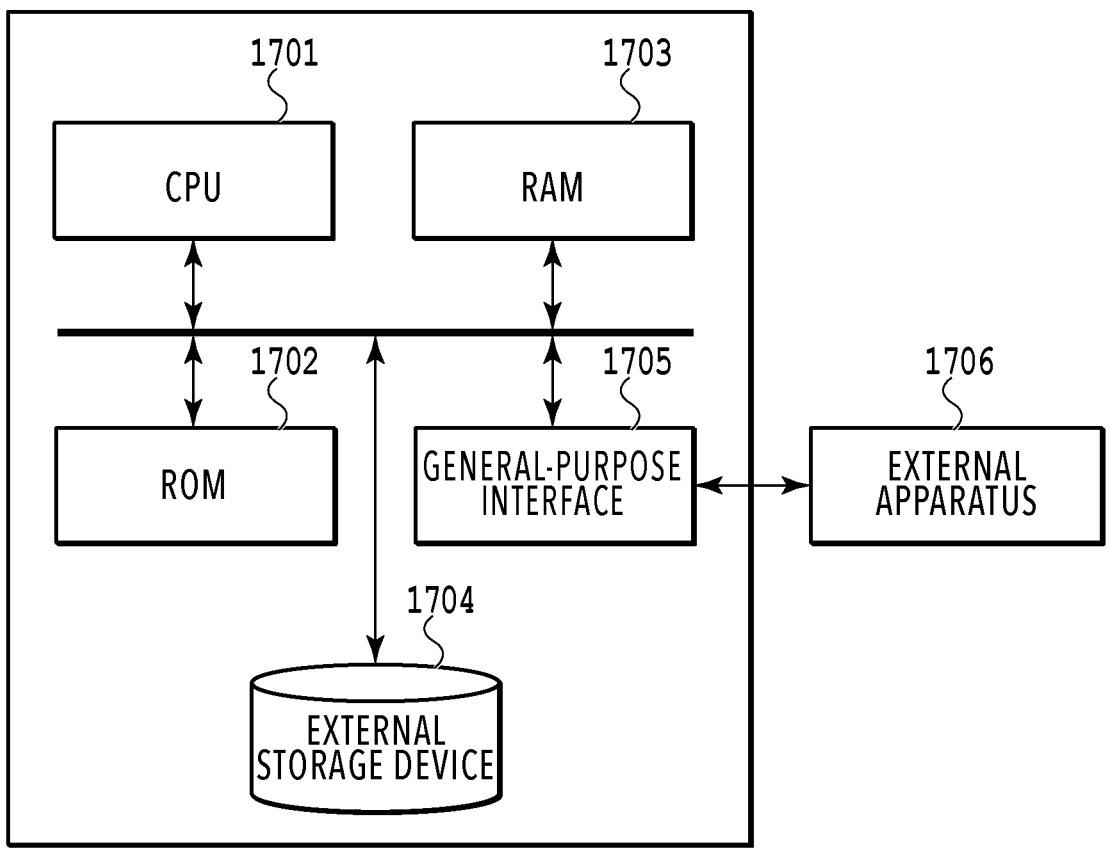
FIG. 17 is a hardware configuration diagram.

It is possible to implement the apparatus, such as the image file generation apparatus and the image generation apparatus explained in the first, second, and third embodiments by the same configuration as the configuration of a general computer as shown in FIG. 17. A CPU (Central Processing Unit) 1701 controls the operation of the entire apparatus by using input data or computer programs stored in a ROM 1702 and a RAM 1703, to be described later. It may also be possible to comprise one piece or a plurality of pieces of dedicated hardware different from the CPU 1701 or a GPU (Graphics Processing Unit) and for the dedicated hardware or the GPU to perform at least part of the processing by the CPU 1701. As the dedicated hardware, for example, there are an ASIC (Application Specific Integrated Circuit), a DSP (Digital Signal Processor), and the like.

The ROM (Read-Only Memory) 1702 stores setting parameters for setting each unit of the apparatus, a boot program, and the like. The RAM (Random Access Memory) 1703 has a storage area temporarily storing computer programs and data read from an external storage device 1704 and data received from the outside via a general-purpose interface 1705, to be described later. Further, the RAM 1703 is used as a storage area used by the CPU 1701 in a case of performing various kinds of processing.

The external storage device 1704 is a storage device storing various kinds of data and the like necessary for the CPU 1701 to perform various kinds of processing and is, for example, an HDD (Hard Disk Drive) or the like. The general-purpose interface 1705 is an interface for communicating with an external apparatus 1706 and is, for example, a USB (Universal Serial Bus) interface or the like.

Further, in the above-described configuration, each function of the apparatuses and devices is implemented by the CPU 1701 reading and executing programs capable of implementing the flows (flowcharts) of the processing shown in FIG. 8, FIG. 13, FIG. 15 and the like.

Furthermore, in the first, second, and third embodiments, the example is explained in which as additional information that is assigned to an image file, advertisement information (virtual advertisement information and actual advertisement information) is assigned, but the example is not limited to this. As another example of additional information that is assigned to an image file, a case is explained where information (hereinafter, referred to as player information) relating to a player captured in virtual viewpoint information is assigned. In a case where player information is assigned to an image file in accordance with the ISO BMFF standard, in the meta box, information relating to data type, number of pieces of data, data size of each piece of information, address of player information database is described. Here, data type is information indicating that additional information is information relating to a player, number of pieces of data is the number of pieces of player information, and data size of each piece of information is information indicating the data size of the player information. Information relating to address of player information database is address information for connecting to a database in which player information is accumulated. In a case where address information is not described in the meta box, player information ID, provider of player information, creator of player information, sports name, sports stadium name, game day, display time, display start time, and display end time are described in the data box. Further, in a case where address information is not described in the meta box, information on expiration date, player information model data, player information material data, display effect, virtual viewpoint dependence, player information paste area on virtual viewpoint image, and priority is described in the data box. In a case where address information is described in the meta box, only player information ID is described in the data box As above, it is possible to apply the present invention to information other than advertisement information.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in a case where a virtual viewpoint image is displayed, it is possible to display a virtual viewpoint image to which additional information is assigned.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-237547, filed Dec. 19, 2018, which is hereby incorporated by reference herein in its entirety.

What is claimed is:

1. A file generation apparatus comprising:
one or more hardware processors; and
one or more memories storing one or more programs configured to be executed by the one or more hardware processors, the one or more programs including instructions for:
(1) acquiring material information for generating a virtual viewpoint image based on a plurality of captured images obtained from a plurality of image capturing apparatuses, the acquired material information including information for specifying positions and orientations of the plurality of image capturing apparatuses, wherein the positions of the plurality of image capturing apparatuses differ from each other and the orientations of the plurality of image capturing apparatuses differ from each other;
(2) acquiring additional information for specifying display information that is included in the virtual viewpoint image generated based on the material information; and
(3) generating a file, for generating the virtual viewpoint image including the display information, the file including (a) the acquired material information and (b) the acquired additional information.

2. The file generation apparatus according to claim 1, wherein the additional information includes data representing a shape of the predetermined information and data representing texture of the predetermined information.

3. The file generation apparatus according to claim 1, wherein the additional information includes an address indicating a location where (i) data representing a shape of the predetermined information and (ii) data representing texture of the predetermined information are stored.

4. The file generation apparatus according to claim 1, wherein the additional information includes information indicating an area in which the predetermined information is displayed on the virtual viewpoint image.

5. The file generation apparatus according to claim 1, wherein the additional information includes information relating to an expiration date indicating a period during which the predetermined information is displayed on the virtual viewpoint image.

6. The file generation apparatus according to claim 1, wherein the material information includes at least one of a plurality of captured images obtained by capturing an object by the plurality of image capturing apparatuses, parameters relating to the plurality of image capturing apparatuses, and a background model for generating a background image on a virtual viewpoint image.

7. The file generation apparatus according to claim 1, wherein the generated file is a file in accordance with an ISO BMFF (ISO base media format) standard.

8. The file generation apparatus according to claim 7, wherein the generated file is a file in which the material information and the additional information are stored in an identical box.

9. The file generation apparatus according to claim 1, wherein the display information is an advertisement included in the virtual viewpoint image.

10. The file generation apparatus according to claim 9, wherein the additional information includes at least one of (i) information relating to an actual advertisement that is installed in a real space and (ii) information relating to a virtual advertisement that is added virtually to a virtual viewpoint image.

11. The file generation apparatus according to claim 9, wherein the additional information includes at least one of (i) information indicating an advertiser of the advertisement, (ii) information indicating a creator who has created the advertisement, (iii) information indicating a display time during which the advertisement is displayed on the virtual viewpoint image, and (iv) information indicating priority of the advertisement.

12. The file generation apparatus according to claim 1, wherein the additional information includes information indicating the three-dimensional position where the display information is placed.

13. The file generation apparatus according to claim 1, wherein the three-dimensional position where the display information is placed is determined by designating a position in an image representing an area captured by the plurality of image capturing apparatuses.

14. The file generation apparatus according to claim 13, wherein the three-dimensional position where the display information is placed is determined by selecting a position from among predetermined positions in an image representing an area captured by the plurality of image capturing apparatuses.

15. An image generation apparatus comprising:
one or more hardware processors; and
one or more memories storing one or more programs configured to be executed by the one or more hardware processors, the one or more programs including instructions for:
(1) acquiring a file including (a) material information for generating a virtual viewpoint image based on a plurality of captured images obtained from a plurality of image capturing apparatuses, the acquired material information including information for specifying positions and orientations of the plurality of image capturing apparatuses, wherein the positions of the plurality of image capturing apparatuses differ from each other and the orientations of the plurality of image capturing apparatuses differ from each other and (b) additional information for specifying display information that is included in the virtual viewpoint image generated based on the material information; and
(2) generating a virtual viewpoint image including the display information based on the acquired file.

16. The image generation apparatus according to claim 15, wherein the additional information includes dependence information indicating whether or not display of the predetermined information on a virtual viewpoint image depends on a virtual viewpoint, and
wherein (a) in a case where the dependence information indicates that the display of the predetermined information depends on a virtual viewpoint, there is generated a virtual viewpoint image on which the predetermined information is displayed on a condition that a virtual viewpoint is set to a predetermined line-of-sight position and a predetermined line-of-sight vector; and (b) in a case where the dependence information indicates that the display of the predetermined information does not depend on a virtual viewpoint, there is generated a virtual viewpoint image on which the predetermined information is displayed irrespective of a line-of-sight position and a line-of-sight vector of a virtual viewpoint.

17. The image generation apparatus according to claim 15, wherein the one or more programs further include instructions for setting a line-of-sight position and a line-of-sight vector of a virtual viewpoint, and wherein the virtual viewpoint image is generated based on the line-of-sight position and the line-of-sight vector of the virtual viewpoint.

18. A file generation method comprising:

a first acquisition step of acquiring material information for generating a virtual viewpoint image based on a plurality of captured images obtained from a plurality of image capturing apparatuses, the acquired material information including information for specifying positions and orientations of the plurality of image capturing apparatuses, wherein the positions of the plurality of image capturing apparatuses differ from each other and the orientations of the plurality of image capturing apparatuses differ from each other;

a second acquisition step of acquiring additional information for specifying display information that is included in the virtual viewpoint image generated based on the material information; and a file generation step of generating a file for generating the virtual viewpoint image including the display information, the file including (a) the material information acquired by the first acquisition step and (b) the additional information acquired by the second acquisition step.

19. A non-transitory computer-readable storage medium storing a program for causing a computer to execute a method, the method comprising:

a first acquisition step of acquiring material information for generating a virtual viewpoint image based on a plurality of captured images obtained from a plurality of image capturing apparatuses, the acquired material information including information for specifying positions and orientations of the plurality of image capturing apparatuses, wherein the positions of the plurality of image capturing apparatuses differ from each other and the orientations of the plurality of image capturing apparatuses differ from each other;

a second acquisition step of acquiring additional information for specifying display information that is included in the virtual viewpoint image generated based on the material information; and a file generation step of generating a file for generating the virtual viewpoint image including the display information, the file including (a) the material information acquired by the first acquisition step and (b) the additional information acquired by the second acquisition step.

* * * * *